United States Patent [19]

Nitardy

[11] Patent Number: 4,593,287
[45] Date of Patent: Jun. 3, 1986

[54] FM/CW SWEEP LINEARIZER AND METHOD THEREFOR

[75] Inventor: John H. Nitardy, Seattle, Wash.

[73] Assignee: The Boeing Company, Seattle, Wash.

[21] Appl. No.: 428,841

[22] Filed: Sep. 30, 1982

[51] Int. Cl.[4] .............................................. G01S 13/34
[52] U.S. Cl. .................................. 343/17.5; 328/162; 328/184
[58] Field of Search .................. 343/14, 7.5, 17.5; 328/184, 162; 307/228, 263

[56] References Cited

U.S. PATENT DOCUMENTS

| | | | |
|---|---|---|---|
| 3,144,623 | 8/1964 | Steiner | 331/178 |
| 3,185,938 | 5/1965 | Pelosi | 331/11 |
| 3,340,529 | 9/1967 | Blitz | 343/14 |
| 3,341,849 | 9/1967 | Cordry et al. | 343/14 |
| 3,382,460 | 5/1968 | Blitz et al. | 331/4 X |
| 3,383,619 | 5/1968 | Naubereit et al. | 331/4 |
| 3,504,294 | 3/1970 | Martin, Jr. | 331/4 |
| 3,519,955 | 7/1970 | Mead, Jr. | 331/178 |
| 3,651,422 | 3/1972 | Underhill | 331/1 A |
| 3,676,794 | 7/1972 | Bidell et al. | 331/11 |
| 3,728,724 | 4/1973 | Alpers | 343/7.5 |
| 3,739,374 | 6/1973 | Kiowski | 340/347 DA |
| 3,761,835 | 9/1973 | Cook | 331/1 A |
| 3,764,933 | 10/1973 | Fletcher et al. | 331/1 A |
| 3,825,855 | 7/1974 | Basset et al. | 331/1 A |
| 4,008,475 | 2/1977 | Johnson | 343/14 |
| 4,038,612 | 7/1977 | Borofka et al. | 328/184 |
| 4,083,015 | 4/1978 | Popodi | 331/4 |
| 4,103,250 | 7/1978 | Jackson | 331/1 A |
| 4,106,020 | 8/1978 | Johnson | 343/14 |
| 4,123,724 | 10/1978 | Das et al. | 331/1 A |
| 4,129,832 | 12/1978 | Neal et al. | 328/184 X |
| 4,160,958 | 7/1979 | Mims et al. | 331/4 X |
| 4,190,807 | 2/1980 | Weber | 331/1 A |
| 4,205,314 | 5/1980 | Strauch | 343/7.5 X |
| 4,272,729 | 6/1981 | Riley, Jr. | 331/1 A |
| 4,291,309 | 9/1981 | Spiller et al. | 343/14 X |
| 4,342,007 | 7/1982 | Elliot | 328/184 X |
| 4,367,473 | 1/1983 | Marin et al. | 343/7.5 X |
| 4,417,218 | 11/1983 | Berke | 328/184 X |

Primary Examiner—T. H. Tubbesing
Assistant Examiner—John B. Sotomayor
Attorney, Agent, or Firm—Hughes & Cassidy

[57] ABSTRACT

A sweep linearization network for an FM/CW radar system, wherein the transmitter sweep rate is subject to variation as a function of range, is comprised of a sweep slope circuit for establishing a desired sweep rate for the interrogation signal of the radar transmitter; an accumulator/memory having stored therein a plurality of sweep slope coefficients corresponding to N discrete sweep segments of an individual sweep of the interrogation signal; a driver for developing a ramp signal controlling the sweep of the interrogation signal, which receives the sweep slope signal and, sequentially, the sweep slope coefficients for adjusting the ramp signal over each of the N sweep segments; a transmitter sampling circuit for developing a transmitter characteristic signal proportional to and indicative of the interrogation signal; a discriminator for dividing the transmitter characteristic signal into a plurality of equal frequency excursion time periods based upon a preselected amplitude thereof to develop a measured time signal proportional to and indicative of the frequency versus time relationship of the interrogation signal; a timing circuit for establishing N equal time periods over the duration of a single sweep to develop a comparison time signal; and a processor for comparing the measured time signal for the selected segment with the comparison time signal to develop an error signal proportional to and indicative of any sweep slope error over a corresponding time segment $N_i$, wherein the error signal is applied to the accumulator/memory circuit for updating the respective sweep slope coefficient and thereby sequentially linearize the sweep as a consequence thereof.

16 Claims, 10 Drawing Figures

FIG. 7 (CHARACTERISTIC SIGNAL)

FIG. 8 (TIMING SIGNAL)

FIG. 9 (RESET SIGNAL)

FIG. 10

FM/CW SWEEP LINEARIZER AND METHOD THEREFOR

BACKGROUND OF THE INVENTION

1. Field of the Invention

The present invention relates, generally, to networks and methods for linearizing FM/CW radar systems and, more especially, to such networks and methods wherein the driving circuitry for the transmitter is controlled to provide a linear sweep of the interrogation signal. The present invention is adaptable for various uses, including applications in aircraft altimeters, autocollision avoidance radar systems and missile guidance systems.

2. Description of the Background Art

FM/CW radar systems are well known and enjoy many applications. FM/CW radar systems offer many advantages over pulse radar systems, which require interrogation signals having high peak power and a fairly precise time reference to obtain adequate target resolution; oftentimes also requiring elaborate precautions against errors which can arise due to variations in, e.g., pulse width of the interrogating signal in order to maintain acceptable target discrimination and/or resolution. On the contrary, FM/CW radar systems, with their frequency modulated continuous interrogation wave, make possible range resolution of a target simply as a function of frequency and further admit of the advantage of continuous measurement without time reference.

The foregoing theoretical advantages to the contrary notwithstanding, FM/CW radar systems are not without their indigenous problems. Crucial to the accurate resolution of a target or object field is the linearity of the sweep of the frequency of the transmitter signal. As these radar systems rely upon the mixing of the interrogation and reflection signals to achieve a beat or difference frequency indicative of range, any nonlinearity in the sweep of the transmitter frequency will manifest itself as a false or inaccurate indication. More specifically, where the sweep is linear and when the transmitter signal is then mixed with the receiver signal, the optimal result of a single value beat frequency representing range is achieved. However, where the transmitter signal is not swept linearly, the beat frequency achieved upon mixing will vary as a function of time proportional to the degree of nonlinearity. Hence, a point target will appear extended and the reliability of the system for target discrimination is reduced dramatically.

Prior approaches to linearizing these systems have focused on control of the transmitter sweep circuitry to provide the desired degree of resolution. Many have striven toward the control of the modulation of the continuous wave by the use of feedback loops associated with the transmitter circuitry. Sometimes the approaches are fairly simplistic, other times very complex.

Representative of certain prior art systems is that disclosed in U.S. Pat. No. 3,341,849. The patentees there are concerned about errors inhering in an FM/CW altimeter due to any inaccuracy in operation of the transmitter system. The principal approach to resolution of the problem is the continuous adjustment of the average frequency versus time relationship in the transmitter to insure accurate altitude indications during use and over the range of the instrument. This is achieved, in capsule sum, by monitoring the transmitter, applying a coupled signal as one input to a mixer and a delayed signal as another to generate an error signal proportional to any inaccuracy in the transmitter output; this error signal being utilized to control the transmitter modulation circuitry.

U.S. Pat. No. 4,008,475 discloses a stabilizing and calibrating circuit for FM/CW radar systems. The approach suggested there utilizes continuous feedback to the FM oscillator to account for, and eliminate, drift in the frequency excursions of the FM waveform controlling the transmitter. A control signal is derived by, inter alia, monitoring the transmitter signal and generating a delayed signal representative thereof. This delayed signal is mixed or beat against a signal from the VCO controlling the transmitter in order to obtain a difference signal used for calibration. The difference signal, having been suitably processed, is applied through a loop to control the oscillator.

U.S. Pat. No. 4,106,020 is also concerned with the problem of undesirable changes in FM modulation waveforms for an FM/CW radar. This approach differs conceptually from the foregoing, insofar as the results of variation are compensated rather than the cause of variation (i.e., nonlinearity) being controlled. The disclosed system utilizes a target-simulating delay line and a scaling network to compensate for undesirable deviations in the modulation waveform. In part, this is achieved by applying signals representative of a target to the counting terminal of a counter while a signal representative of a simulated target is coupled to the reset terminal of the counter through a divide-by-N circuit. If the modulation waveform changes, the counter is caused to reset sooner or later by a predetermined amount of time, thereby scaling the target data appropriately, based upon errors in the peak amplitude of the modulation waveform and/or its period. While this patented system discloses a type of correction, it is one simply predicated upon a scaling factor and does not address compensation for nonlinearity in transmitter sweep frequency.

U.S. Pat. No. 3,340,529 is interesting in its disclosure of an FM aircraft altimeter designed to reduce so-called "step errors", which arise where target range is in error by an integral number of cycles. Most remarkable about the approach suggested there is that it employs an intentional impression of a nonlinear phase change to overcome this "step error" problem. Thus, as opposed to addressing the problem of nonlinearity in the transmitter frequency sweep, such nonlinearity is intentionally created.

Of fairly broad or general applicability within the context of the present invention are U.S. Pat. No. 4,038,612 and No. 4,129,832; both of which relate to networks for generating linear frequency ramps used to control, e.g., a VCO. Each is further noteworthy for the inclusion of a memory circuit (e.g., a random access memory—"RAM") which operates upon the driving signal in a way to provide for linearity in the output. In the case of the '612 reference, the VCO responds to a controlled voltage ramp in which variations are detected by an error-sensing circuit at predetermined, accurately timed points. Discrete errors at plural points throughout the frequency ramp are computed and integrated over a plurality of sweep cycles and are thence employed as compensation for any nonlinearity. Zero crossings of a sampled signal characteristic of the swept oscillator output are determined and applied to a digital memory and integration circuit which stores samples over a number of cycles of the frequency ramp and integrates individual errors for each sample point over a plurality of sweeps. An error averaging process yields a plurality of correction signals which are fed to a digital-to-analog converter and, on further processing, make appropriate corrections to the ramp signal. As the patentees there briefly summarize, the approach may be thought of as a low-pass process wherein analog signal corrections modify the slope on an instantaneous basis at selected points within the ramp in order to effect linearization of the output. The '832 patent enjoys conceptual similarity, insofar as a programmable memory interfaces with a D to A converter in the control of a VCO with an eye toward linearization through periodic updating of the control circuitry based upon sampling of the output.

While the aforementioned patented systems broadly involve, and to varying degrees, FM/CW ranging systems (or like instruments) and problems associated with certain instabilities thereof (and principally nonlinearity), none discloses or suggests a network for accomplishing the objective of linearization in the face of varying sweep rates. That proves to be a substantial limitation on the adaptability of known systems, and particularly as respects airborne target seekers such as those associated with missile guidance. More specifically, FM/CW radar systems used in the guidance of a missile to a desired target employ variable sweep rates (respecting the frequency versus time relationship of the interrogation signal), which variation is a function of range from the missile to the desired target. Longer ranges imply lower slopes while the closer the approach the steeper the slope. A rationale behind the variation in sweep rate is the maintenance of a constant frequency intermediate frequency which is conveniently obtained by increasing the sweep rate the closer the missile approaches the desired target and the shorter the propagation time becomes. None of the systems discussed above adresses the linearization of the sweep of the transmitter signal of an FM/CW radar by segmented, sequential sampling thereof, and appropriate and parallel segmented, sequential correction in the face of varying (and perhaps widely so) sweep rates.

Accordingly, the need exists to provide an improved system for linearizing the sweep of the interrogation signal of an FM/CW radar; and particularly one where the sweep rate is a variable function over range. The need further exists to provide such a system which is of relatively low cost, compact and lightweight, and yet which is reliable in operation.

SUMMARY OF THE INVENTION

The present invention advantageously provides a linearization network for an FM/CW radar which effectively controls the driving circuitry for the transmitter output oscillator in a manner ensuring a linear sweep thereof. The network of the present invention is desirable for its ability to effectuate close control over the sweep characteristics irrespective of variation in the sweep rate. Linearity to within about 0.1% is achievable within a fairly short amount of time and is thereafter maintained on a reliable basis.

The foregoing advantages are achieved in accordance with one aspect of the present invention by sampling the output signal of a typically nonlinear device (such as a VCO) responsible for generating the sweep of the transmitter signal of an FM/CW radar, discriminating that signal into a plurality of equal frequency excursion time segments and comparing the characteristics of at least one of those temporal periods with the characteristics expected were the VCO operating linearly, and thence generating an error signal proportional to and indicative of any sweep slope error thereof for the purpose of updating a programmable memory controlling the driving signal for the VCO. In accordance with a preferred approach to this end, timing signals are generated to provide controlled clock pulses of equitemporal period within a given cycle but wherein the parameters are dictated as a variable function of sweep rate and further wherein these timing pulses adjust the sampling and control circuits in the network to conform correction to the extant slope or rate of change of output frequency with time. The programmable memory stores sweep slope coefficients corresponding to each of the discrete time periods of interest, which coefficients are periodically updated as governed by the error signal developed upon measurement and comparison of the experienced characteristics with expected characteristics were the system operating under linear sweep conditions.

In one preferred embodiment, the individual sweep is divided into an arbitrary number of short sampling time segments and a precise segment is selected for examination, processing, and correction. The error signal characteristic of any sweep slope error over that segment is employed in a subsequent sweep to update the corresponding sweep slope coefficient in the memory and make the appropriate adjustment for nonlinearity while a different segment is being examined. In this manner, the segments are sequentially processed seriatim. In an alternate but nonetheless highly preferred embodiment, the preselected time period is examined over multiple sweeps and an averaging method employed for correction and updating before moving on to another desired segment. In either event, however, an algorithm is utilized for error computation, but most preferably in a way that only a fraction of the necessary control is utilized at any precise updating step, to effectuate thereby a one-pole digital filtering technique.

The method outlined in capsule above may be implemented in any of a number of ways. A preferred network includes a sweep slope circuit which provides a sweep slope signal for establishing and varying as may be required the desired sweep rate for the interrogation signal of the radar transmitter. This slope signal is applied as one input to a driver which develops a driving ramp signal, in turn controlling the transmitter oscillator. An accumulator/memory device, preferably a random access memory, has stored therein sweep slope coefficients corresponding to each of the N time increments constituting the sweep, which coefficients are likewise applied as an input to the driver. A slope signal is a product of those inputs; most preferably achieved by utilizing a multiplying digital-to-analog converter for that circuit element. A frequency discriminator receives a transmitter characteristic signal, having a lower frequency than but nonetheless replicating the interrogation signal, and divides that characteristic signal into a plurality of equal frequency excursion time segments for individual examination and analysis. The time period for a segment, based upon the frequency excursion defined at a predetermined amplitude of the characteristic signal, is measured and compared in a signal processor with the time expected were the transmitter operating in a linear fashion. A clock in combination with a voltage comparator is preferably employed to measure the respective time periods, most preferably with reference to successive zero crossings of the frequency discriminator signal for one complete frequency discriminator cycle. An adaptive algorithm ratios the measured and expected times and scales any error determined thereby to yield an error signal indicative of deviations of the time period for the frequency excursion from the ideal. This error signal, representing some fraction of the ultimate correction required, is applied to update the sweep slope coefficient stored in the RAM for the respective time period or segment of the sweep. Timing in combination with the application of but a fraction of the correction required in sequential form provides for periodic updating and correction on a subsequent sweep for the segment of interest while a new segment is examined for the purpose of generating a correction signal therefor.

The timing circuit is employed in order to conform operation of the network to the variable sweep rate of the transmitter. Preferably, a voltage-to-frequency converter receives the sweep slope signal indicative of the sweep rate and generates timing and reset clock pulses for establishing the N equal time periods, where the period varies inversely with variations in the sweep rate. These timing signals are employed in an address counter and sweep counter to sequence the error sampling and computation circuitry, as well as to reset the system.

Specific embodiments include features to prevent overflow/underflow of the memory, delays to account for tardiness in system response, and like, highly specific elements to improve upon the efficiencies of the instant network. These and other specific implementations will become more apparent, and a fuller appreciation of the scope of the present invention will be gained, upon an examination of the following detailed description thereof, taken in conjunction with the figures of drawing, wherein:

DETAILED DESCRIPTION OF THE INVENTION

The present invention relates generally to FM/CW radar linearization systems and, more especially, to one which periodically adjusts or alters the driving signal affecting the output sweep of frequency in order to make adjustments for any nonlinearity thereof. The present invention thereby enjoys particular suitability in FM/CW radar systems employed for missile guidance; but also has broader applications, including use in aircraft altimeters, autocollision avoidance radars or the like. Accordingly, the present invention will now be described with reference to certain embodiments within the aforementioned contexts; albeit, those skilled in the art will appreciate that such descriptions are meant to be exemplary only and should not be deemed limitative.

Figure 1:
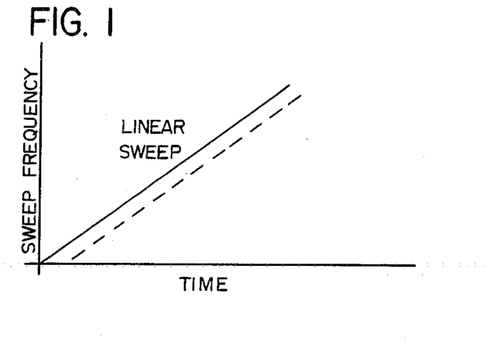
FIGS. 1 through 4 illustrate graphically a comparison of linear versus nonlinear sweep in the frequency of an FM/CW radar and the respective consequences thereof.
Figure 2:
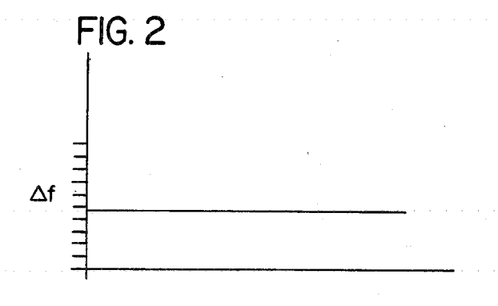
Figure 3:
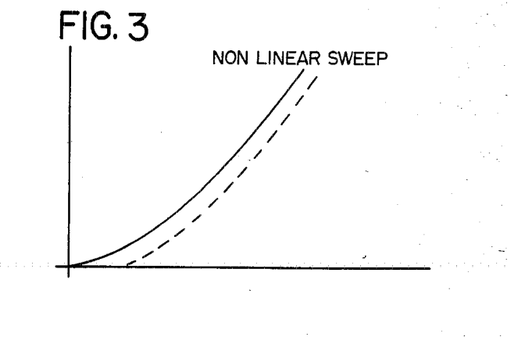
Figure 4:
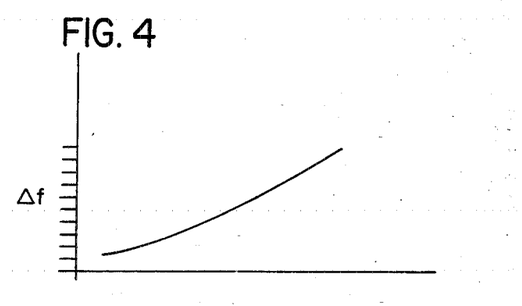

Turning to the figures of drawing, FIGS. 1 and 2 graphically illustrate the optimal operating conditions of an FM/CW radar. FIG. 1 is a graph showing transmitter frequency versus time, as the solid line, and the reflected or receiver signal as the dashed line. Under these ideal conditions, where the frequency of the transmitter is swept linearly, the mixing of the transmitter and receiver signals will result in a single value beat frequency, shown in FIG. 2. The value of that frequency is a direct indication of the range of the target or target area responsible for the reflected or received signal. Were conventional FM/CW radar systems to operate in the field in accordance with theory, as represented in FIGS. 1 and 2, target resolution would be an easy task. However, practical systems do not reach these ideallic conditions given the current state of the art. Typically, the transmitter sweep is not perfectly linear and deviations from such linear conditions can occur randomly; although usually at a relatively slow rate. FIGS. 3 and 4 illustrate graphically one situation where the transmitter frequency is swept nonlinearly, giving rise to a beat or difference frequency which varies as a function of time as represented in FIG. 4. Contrary to the ideal situation represented in FIG. 2, a single point source now gives rise to a multiple frequency return otherwise indicative of an extended target.

Figure 5:
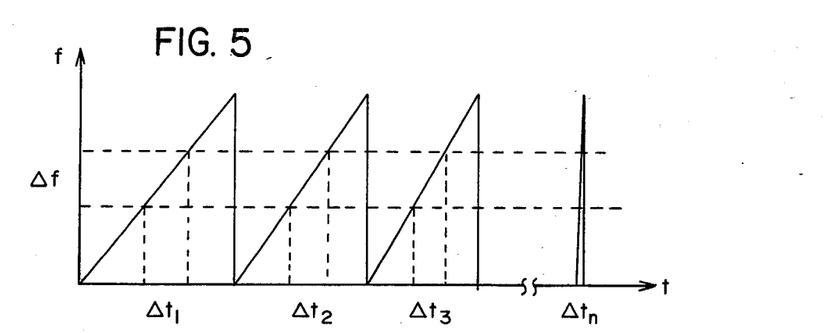
FIG. 5 illustrates graphically a hypothetical variation in sweep rate for an FM/CW radar system used as a seeker in the guidance of a missile.

While it is expected that there will be inherent nonlinearities in the sweep of the interrogation signal of an FM/CW radar—expected due to, inter alia; nonlinearity in the output oscillator (typically a VCO such as a Gunn Diode Oscillator), temperature changes, and the like—these problems are exacerbated significantly when one considers a seeker system for the guidance of a missile. FIG. 5 illustrates the reasons for this compounding of problems, wherein it can be seen that the slope of the interrogation sweep itself varies over time in this application.

Figure 6:
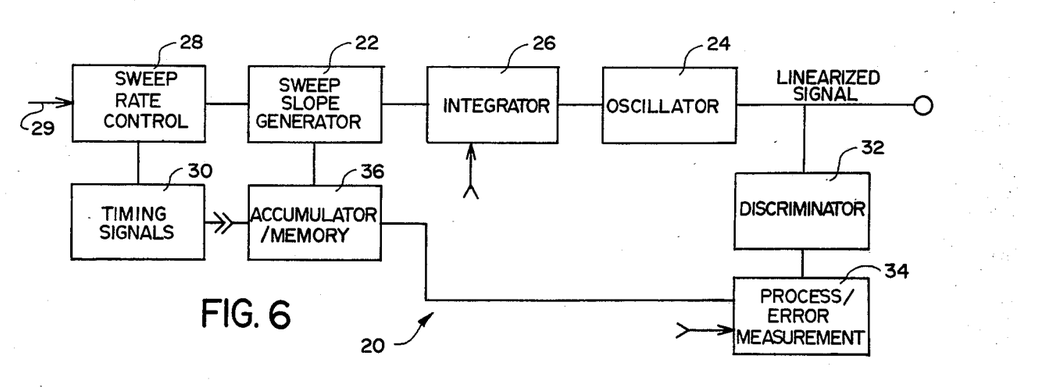
FIG. 6 is a simplified block diagram of a network for linearizing the output of an FM/CW radar transmitter in accordance with the present invention.

The overall guidance system is desirably one where a constant frequency intermediate frequency ($\Delta f$) is maintained irrespective of the range of the missile from the desired target and, thus, irrespective of propagation time. But, as the seeker approaches closer to the destined point of impact, the propagation time becomes progressively shorter as illustrated in FIG. 5. Consequently, the slope of transmitter frequency versus time is made progressively steeper to accommodate the objective of a uniform intermediate frequency. This is shown on a highly exaggerated scale in FIG. 5, in order simply to illustrate these operating conditions. Prior approaches attempting to achieve linearization of the transmitter sweep simply fail to take into account the manner in which this linearization is to be performed in these situations where the transmitter sweep rate itself varies. FIG. 6 illustrates a simplified block diagram of a network which achieves this aim.

The linearization network depicted in FIG. 6, identified generally as 20, is one which generates and compares characteristic signals for both measured and expected temporal excursions in order to develop a computed error which is used to control the sweep of output frequency. Timing signals governing both the sampling of transmitter characteristic data and generation of comparison data are themselves controlled in response to variations in sweep rate. Within this context, correction signals are utilized at only fractional value in order to make linearization compensation approach correction over a period corresponding to multiple sweeps as the causes of nonlinearity tend to be somewhat noise-like, but statistically rather slow or gradual ones themselves.

Turning to the specific circuitry of the network 20, a sweep slope generator 22 establishes a sweep slope signal which is responsible for basic control of the output frequency of an oscillator 24, typically a voltage controlled oscillator such as a Gunn Diode Oscillator. The sweep slope generator 22 will normally develop a step-like output signal representative of sweep slope; in which case an integrator 26 will be interposed between the sweep slope generator and oscillator to create the actual voltage versus time slopes. The oscillator output is applied, e.g., to a transmitting antenna or whatever other network might be desired.

The sweep rate, as illustrated graphically in FIG. 5, is established by sweep rate control circuitry 28, wherein an appropriate signal is developed which dictates the slope of the frequency sweep depending upon the range to the target in order to maintain a uniform intermediate frequency as described above. More specifically, and in particular respect of the use of circuit 20 in a missile guidance system, the sweep rate control circuit 28 receives an input signal 29 indicative of range to the destined target. Sweep rate control circuit 28 responds to that range input signal as the same varies with distance to the target to generate the desired sweep rate variation through application of a sweep rate control signal to the sweep generator 22 whereby, ultimately, the sweep varies in the manner illustrated in FIG. 5. This same control signal, e.g., a variable biasing voltage, is applied to a timing circuit 30 which provides timing or clock pulses dividing the sweep into a plurality of N equitemporal segments. These pulses are then utilized to control all sampling, comparison, and reset functions of the circuit as described more fully hereinbelow.

The output of oscillator 24 is sampled, through appropriate isolation devices, in order to develop a transmitter characteristic signal proportional to and indicative of the frequency sweep. A discriminator 32 segments each sweep cycle into a preselected number of equal frequency excursion time segments corresponding to the segments established by the timing signal generator 30. These individual time segments are preferably achieved by establishing a reference amplitude for the sampled characteristic signal and measuring the time for each cycle as the signal passes through the reference. An error signal may then be developed in a processor 34 by comparing the measured time period(s) with the expected time period(s). Were the transmitter operating under perfectly linear frequency sweep conditions, both the measured and expected times would be identical and no slope correction or error factor would be developed under those situations. However, that is not the case under even the best of conditions, and differences between the measured and expected times will yield a signal proportional to and characteristic of the degree of nonlinearity as indicated by the frequency versus time relationship of the signal. This error signal is applied to an accumulator/memory device 36 in which is stored sweep slope coefficients for each of the N individual segments of the transmitter sweep. The error is used in an additive sense with the appropriate sweep slope coefficient for the related segment $N_i$ in order to alter the signal in sweep slope generator 22 and also to update that same sweep slope coefficient previously stored in memory for subsequent control of the sweep slope over the appropriate time period. The timing signals issuing from the timing generator 30 effectuate correct address location within the memory to correlate the sampling of the precise time segment therewith.

Figure 7:
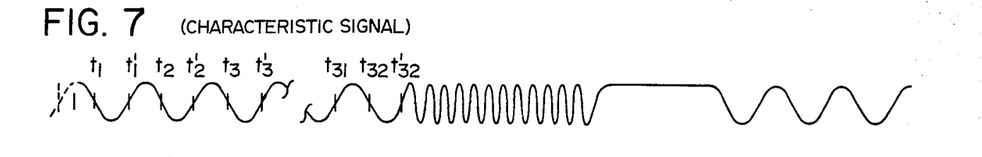
FIGS. 7-9 illustrate the timing sequences for the sampling and correction circuitry in accordance with the present invention; and, FIG. 10 is a detailed block, diagram of one preferred embodiment in accordance with the present invention.
Figure 8:
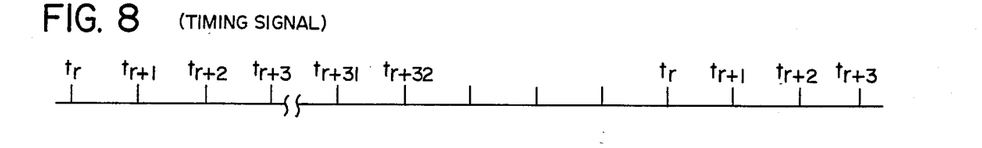
Figure 9:
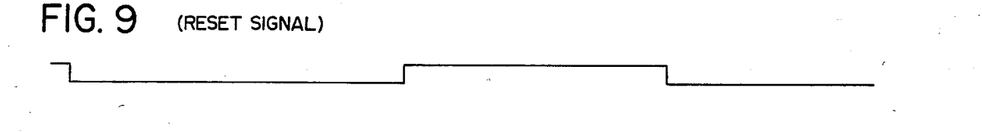

FIGS. 7 through 9 illustrate the timing sequences for the circuitry of the linearization network of the present invention. In capsule sum, FIG. 7 shows a complete sweep cycle for the transmitter, including flyback and reset, and the initiation of the next subsequent cycle, while FIGS. 8 and 9 represent the related timing and reset signals used for control of both the transmitter sweep and the processing circuitry on the same time scale. The equal frequency excursion characteristic of the output of oscillator 24, as shown in FIG. 7, is discriminated into a plurality of time periods based upon zero crossings of the generally sinusoidal waveform. Although any other amplitude value might be used as a reference, zero crossings are selected for ease of processing—to render equal frequency excursion segments insensitive to the amplitude of the frequency discriminator output. Two specific sequences are established in this regard; a first $t_i$ which represent the time periods between successive zero crossings in a first direction and a second period $t'_i$ representing zero crossings from the other direction. FIG. 8 shows the timing signals emanating from the signal generator 30, where $t_r$ represents a sweep reset signal as shown in FIG. 9. The clock train of FIG. 8 includes a plurality of pulses identified $t_{r+i}$, whereby each sweep is divided into a plurality of N (here 32) equitemporal periods.

The waveform of FIG. 7 is preferably segregated into the dual time frames (i.e., t and t') in order to eliminate "end effects," as best visualized by comparison of FIGS. 7 and 8. Rather than force the start of the sweep at a specific time relative to zero crossings of the characteristic signal, the present system allows the start of sweep to occur coincident with $t_r$ and irrespective of the phase of the frequency discriminator output, which is shown in FIG. 7. Likewise, where the sweep is divided into the 32 segments shown in these figures (the number being chosen simply for illustration), it can be seen that the last clock pulse $t_{r+32}$ occurs coincident with reset. That is, reset initiation occurs with the shift of the reset control signal from negative to positive ($t_{r+32}$) while the start of sweep occurs with the next shift from positive to negative. The integrator 26 is set to zero during the initial flyback cycle and is then allowed time to stabilize prior to initiation of a subsequent sweep. If the end effects are not adequately taken into account during this sequencing, spurious results may be generated. This is avoided in one aspect of the present invention by utilizing the zero crossings times for the first cycle over the period $t_1$ through $t_2$; but thereafter focusing on the timing cycles corresponding to the primed references (e.g., $t'_1$ through $t'_2$, etc.). In that way, the first portion of the sampling signal—that preceding $t_1$—is discarded as is the last portion—that following $t'_{32}$—thereby avoiding potentially anomalous signals or spurious results in error computation and the generation of inappropriate correction signals. Other types of control might be used to good advantage to achieve this same objective, but the foregoing is preferred for its straightforward simplicity in processing.

In any event, the selected time period between successive zero crossings is measured and provides a direct indication of the frequency versus time characteristics of the output signal over that segment of the sweep. The signal generator provides the corresponding timing signals of FIG. 8 correlated to the precise sweep rate as noted above. Accordingly, as the sweep rate becomes faster, so too does the period between timing signals become shorter. But, the relationship between the timing signals of FIG. 8 representative of optimum conditions and the measured periods of FIG. 7 remains correlated. Comparison of the measured and expected times will provide an indication of deviation from linearity.

It is normally not important (and usually neither essential nor desirable) to measure, compare and correct each individual time period $t_i$—$t_{i+1}$ over a single sweep; although there is certainly no reason (other than complexity of processing) prohibiting such a mode of operation in full accord with the present invention. But, the changes which cause nonlinearity are usually slow changing functions of time dependent upon, e.g., temperature variations or the like, in the nature of drift. That gives rise to the advantageous ability to make compensation changes as rather gradual ones and thereby allows for smaller hardware packages and somewhat slower circuitry without any sacrifice of efficiency. Taking advantage of those conditions, it is envisioned to measure but a single sequence (e.g., $t_1$–$t_2$) for a given sweep. This time period can then be compared with the correlative optimum time period to compute an error signal. The error signal may be used to update the sweep slope coefficient corresponding to that specific segment of the sweep during the next successive sweep while another time segment (e.g., $t'_1$–$t'_2$) is being measured with an eye toward the generation of a respective error signal for that slope segment.

The error signal used for correction due to nonlinearity is computed in accordance with an adaptive algorithm which ratios the measured and expected times. Linearity implies a ratio of one and nonlinearity is reflected in deviations therefrom. The algorithm is most preferably constructed to yield a calculation weighted heavier in respect of the expected times since the generated time periods between clock pulses can be quite accurately controlled. The algorithm is also preferably constructed to yield an error signal which represents but a fraction of that ultimately required as it is correction for slow but progressive variations that is most important—transient changes, even though large, do not pose as significant a problem. Those skilled in the art will have no difficult designing appropriate algorithms to meet the individual requirements of a specific task at hand guided by the principles set forth herein. For illustrative purposes, the algorithm of choice (consistent with the exemplary embodiments discussed infra) is:

$$k \cdot E = \frac{t_{i+1} - t_i}{c(t_{r+x} - t_r)} - \frac{1}{cx}$$

where k, c and x are constants selected for appropriate weighting and scaling of the error E. In the most preferred embodiment, four of the equitemporal time periods $t_r$ are used, thereby yielding an adaptive algorithm of:

$$k \cdot E = \frac{t_{i+1} - t_i}{2(t_{r+4} - t_r)} - \frac{1}{8}$$

where k is the fractional scaling factor (here $\frac{1}{8}$). Faster or slower systems can readily be designed should the exigencies of the specific application so dictate.

The memory circuitry 36 preferably includes a random access memory having specific address locations corresponding to each segment of the sweep; in this exemplary discussion 32 such segments and thus address locations. Each address location contains a sweep slope coefficient which, collectively, define the slope characteristics of the signal generated in the sweep slope generator 22. Were the system to operate under the ideal conditions of perfect linearity, each coefficient would be equal. However, as experience indicates, this will not be the case and variations to the ramp signal over each individual time period will be required in order to achieve ultimately the desired linear output. Thus, the error signal generated for the preselected time period will be applied to the accumulator/memory circuitry to achieve the necessary correction. This is accomplished by adding a signal representative of error to the coefficient for the correlative time period in order to adjust the slope for that period in the sweep slope generator and also to update the stored sweep slope coefficient for subsequent sweeps. As noted above, the entire value of the error necessary for complete correspondence in correction is preferably not added to the existing coefficient, but only a selected portion thereof; for, as further noted above, the correction is achieved gradually for stability and noise immunity purposes, and as well for the reason that the changes necessitating correction are gradual ones themselves. Otherwise, spurious signals might cause rather large changes even though the same are only of rather short duration. Thus, it can be seen that the ramp signal controlling ultimately the sweep of the output oscillator is itself controlled, in terms of its shape, as a response to the combined inputs of the sweep slope signal and a composite of the sweep slope coefficients. The former dictates the principal slope characteristics of the ramp signal; the latter refine those characteristics for each of the successive N sweep segments, adjusting the slope as is required over the individual segments for sweep linearity.

Figure 10:
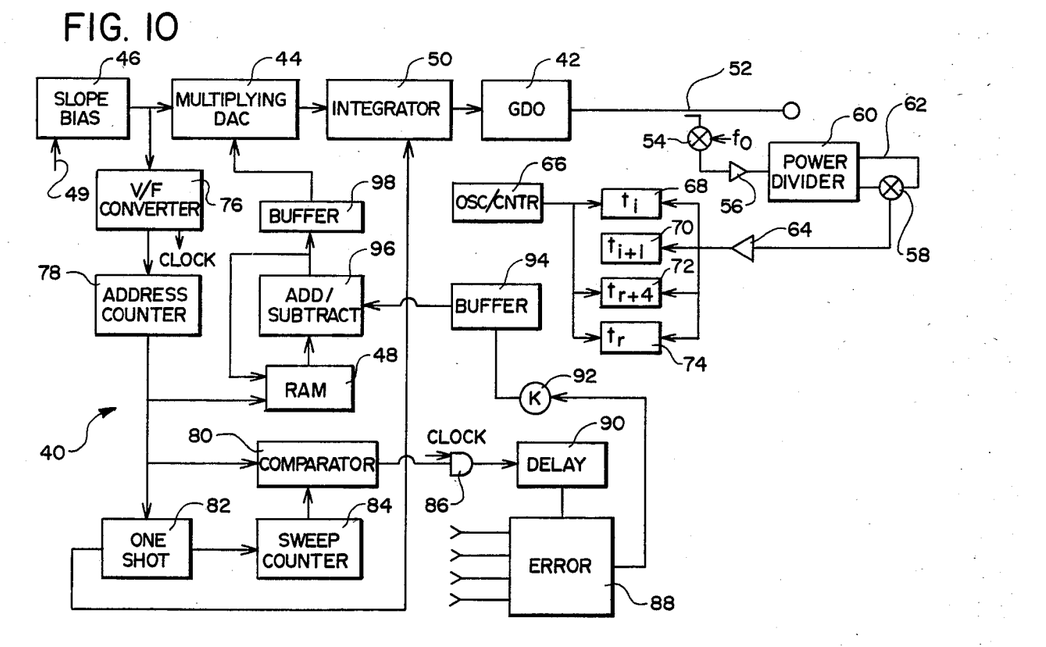

FIG. 10 shows a detailed block diagram illustrating exemplary circuit elements which achieve the linearization noted above. As those skilled in the art will appreciate, this highly specific example is but one way of implementing the present invention and, accordingly, should not be deemed to limit the much broader scope thereof.

The network of FIG. 10, designated generally as 40, utilizes a Gunn Diode Oscillator 42 ("GDO") as the output oscillator of an FM/CW radar transmitter. For the sake of illustration, let it be assumed that the GDO output is a 45 GHz signal with a 500 MHz sweep, the sweep rate of which varies from 2 to 45 microseconds depending upon propagation time as may be visualized with reference to FIG. 5. Using the exemplary time sequences noted above with respect to FIGS. 7—9, the sweep will be divided into 32 equal time periods; each period thereby corresponding to a frequency change of 15.625 MHz, in turn corresponding to a required 64 nsec. delay for the frequency discriminator to produce one complete cycle.

The GDO 42 is driven by a multiplying digital-to-analog converter ("DAC") 44 which generates an analog step function in response to the digital inputs received from a slope bias circuit 46 and a random access memory 48. The slope bias circuit 46 functions as noted above with respect to the sweep rate control circuit 28; in this case receiving an input signal 49 representative of range to the target or object field, which varies over the course of a flight, in order to provide a corresponding variation in sweep rate for maintaining a substantially uniform intermediate frequency. That sweep rate signal for a complete sweep cycle along with the individual sweep slope coefficients applied to the DAC 44 collectively control its output. The resulting step-wise sweep slope generated in DAC 44 is integrated in an integrator 50 for application to the GDO 42 and control of the 500 MHz sweep of the transmitter signal.

That transmitter signal is sampled at a tap 52 which provides good isolation for the sampling circuitry. A mixer 54 beats the sampled, high frequency signal against a standard frequency reference $f_o$ in order to provide a reduced frequency characteristic signal for ease of processing. The transmitter characteristic signal is preferably reduced to about 1 GHz (±250 MHz) but nonetheless replicates the interrogation signal preserving any nonlinearity in the sweep thereof. This transmitter characteristic signal is applied through an amplifier 56 to a discriminator for the purpose of segmenting the same on a temporal basis as shown in FIG. 7.

The discriminator employs a double balanced mixer 58 which acts as a phase detector to measure the phase difference between the 1 GHz nominal frequency and a delayed version of the same signal. The mixer 58 thus receives a first input directly from a power divider 60 and a second input which is delayed along line 62 by 64 nsec. in accordance with the exemplary timing noted above. This produces 360° of phase shift for every 15.625 MHz transcended by the sweep. A voltage comparator 64 receives the signal from mixer 58 and is adjusted for zero crossings of the signal; albeit, zero crossings are selected as a matter of convenience in processing and any other desirable reference amplitude might equally well be used as a benchmark (with due regard for the fact that the preferred zero crossings render the equal frequency excursion segments relatively insensitive to the amplitude of the frequency discriminator output). An oscillator/counter 66 in conjunction with a series of registers or buffers 68, 70, 72, and 74 serves to measure the incremental time periods employed for error correction. The oscillator 66 is preferably a high frequency oscillator in this embodiment, which acts as a high frequency clock in order to provide the necessary accuracy for time measurements. Following the exemplary timing noted above, the oscillator most preferably operates at 25 MHz and includes a 40 nsec. delay line with eight taps in order to subdivide the clock pulses into 5 nsec. increments. The value of this continuously counting clock is transferred into the appropriate storage register with the advent of successive zero crossings ($t_i$ and $t_{i+1}$) in the sweep interval being measured. Likewise, comparison time values (e.g., $t_r$ and $t_{r+4}$) are transferred into the appropriate registers to record four times the sweep interval period. These values are then fed, upon appropriate timing signal commands, to a processor for computation of a scaled error signal through the adaptive algorithm.

The timing signals are developed as a variable function of sweep rate in order to conform linearization correction to the extant, variable sweep of the interrogation signal. This is achieved by correlation with the sweep slope signal. The slope biasing circuitry 46 provides a bias voltage which establishes the sweep rate for the output signal, and varies the same in order to maintain the proper intermediate frequency for the radar system. The output signal is also applied to a voltage-to-frequency converter 76, which provides timing command signals for the circuit 40. In every case, the V/F converter 76 will yield the train of pulses shown in FIG. 8, dividing each sweep into 32 equal time segments using the illustrative timing of this example. But, the individual periods between successive pulses (i.e., $t_r, t_{r+1}$) will vary depending upon the value of the voltage emanating from the slope bias circuit 46. The V/F converter thus yields the appropriate clock pulses for control.

An address counter 78 receives the clock pulses and generates a plurality of control outputs. One output is applied to RAM 48 in order to access appropriate address locations therein for sequencing the sweep slope coefficients in proper order for application to DAC 44. The address counter output is also applied as a first input to a comparator 80 for the ultimate purpose of sampling the buffers 68–74 at the appropriate times. A one shot 82, in this case a 0.5 microsecond one shot in accordance with the exemplary timing scheme established herein, receives an input from address counter 78 and provides plural outputs. One of these outputs is applied as a reset pulse to the integrator 50, corresponding to the sweep reset signal illustrated in FIG. 9. The other output is applied to a sweep counter 84, for example a five bit sweep counter, which determines which sweep interval will be measured and then sequenced. The output of the sweep counter is used as the second input to comparator 80 to achieve that aim, thereby providing a signal to gate 86. A sample command signal issues from gate 86 and is used to control an error algorithm circuit 88, having been passed through a delay line 90 designed to account for circuit delays themselves.

Upon a sample command, the contents of the buffers 68–74 are applied to the error algorithm circuitry 88. The adaptive algorithm used in this example is the preferred one set forth above:

$$k \cdot E = \frac{t_{i+1} - t_i}{2(t_{r+4} - t_r)} - \frac{1}{8}$$

The sweep counter 84 determines the appropriate sweep interval for measurement during each sweep and sequences the computation over the entire N segments.

The error output from the algorithm circuitry 88 is passed through a scaling circuit 92 which applies the scaling factor. The scaled error signal is then transmitted to a buffer 94 and thence to an add/substract circuit 96.

The address counter 78 sequences through the address locations in RAM 48 in order to select the sweep slope coefficient corresponding to the desired segment $N_i$. This sweep coefficient is applied as a second input to the add/subtract circuit 96, wherein the coefficient is combined with the fractional error signal to yield a new, updated sweep slope coefficient for that sweep segment. The updated value is circulated back to the memory of RAM 48 to replace the former value and is then used for sequential sweeps until a new value is computed on a subsequent cycle. The updated sweep slope coefficient is also applied to the multiplying DAC 44 through a buffer 98 to effectuate the appropriate alteration in the conformation of the driving ramp signal ultimately used to control the slope characteristics of GDO 42.

The memory registers in RAM 48 are each preloaded with a slope coefficient selected to be, for illustrative purposes, 0.5. The multiplying DAC receives both the slope bias voltage for setting the sweep rate and the individual sweep slope coefficient seriatim in order to develop its step function output. The measurement and correction circuitry will sample one of the, e.g., 32 sweep segments, operating on it to develop an error signal proportional to any error in frequency excursion for that precise segment. That is scaled and applied additively to the 0.5 coefficient initially stored in the proper address location. The coefficients may vary between 0 and 1 in this manner, as the error signal is combined with the stored coefficient value. The specific coefficient is updated in that way so that the next sweep will see a different value applied to the multiplying DAC in order to effectuate partial slope correction for subsequent sweeps. The next time segment will then be examined and the respective coefficient updated in like manner. After several cycles, linearity is achieved and maintained. Appropriate overflow/underflow protection is built into the RAM so that the registers cannot accept a coefficient value above 1 or below 0. Any attempt to increment the slope coefficients beyond these boundaries will be disregarded.

Linearization to within about 0.1% can be achieved within about 30 seconds. Under most circumstances, this period for control will be entirely adequate and even longer periods acceptable. In that case, the advantage to be gained is the reduction in frequency of the oscillator in the clock circuitry 66 so that the slower times involved will permit the use of conventional MOS devices. The same degree of linearization (i.e., about 0.1%) may nonetheless be achieved; the trade-off thus being quite favorable.

In this alternate and preferred embodiment, the basic circuitry and operation of the linearization network remain the same. However, rather than measuring a selected time segment (e.g., $t'_2-t'_3$) once with a lower clock frequency and correcting for any nonlinearity on the next subsequent sweep, the error value is accumulated over successive sweeps for the same segment. Once the error accumulates to an acceptable level, the accumulated stored values are used in the error-determining algorithm. Then, another sweep segment is selected for examination and the same process is repeated where the error is determined over multiple, as opposed to single, sweeps.

This alternate embodiment is one highly preferred where the sweep rate varies with progressively higher slopes. Whereas a greater number of sweeps (on a numerical basis) are required for correction, the time for each sweep is progressively shorter due to the increasing sweep rate as propagation time decreases. Thus, the advantage of implementation in MOS circuitry offsets the reduction in speed.

As can be seen from the foregoing, the present invention provides a method which simply but efficiently linearizes the sweep of an FM/CW radar transmitter, and on a reliable basis. Various circuits for implementation of this method into hardware may be employed; and other circuit designs will occur to those skilled in the art guided by the principles set forth herein. Accordingly, while the invention has now been described with reference to certain preferred embodiments, those skilled in the art will appreciate that various substitutions, modifications, changes and omissions may be made without departing from the spirit thereof. Thus, it is intended that the scope of the present invention be limited solely by that of the claims granted herein.

What is claimed is:

1. A sweep linearization network for an FM/CW radar system where in the transmitter sweep rate is subject to variation as a function of range, said network comprising:
   a. sweep slope means providing a sweep slope signal controlling the sweep rate of the interrogation signal of an FM/CW radar transmitter;
   b. accumulator/memory means having stored therein a plurality of sweep coefficients corresponding respectively to N discrete segments of an individual sweep of said interrogation signal;
   c. driver means for developing a ramp signal establishing the sweep of said interrogation signal, receiving said sweep slope signal for controlling the slope of said ramp signal and said sweep slope coefficients for adjusting the slope characteristics of said ramp signal over each of said N sweep segments;
   d. transmitter sampling means for developing a transmitter characteristic signal proportional to and indicative of said interrogation signal;
   e. discriminator means for dividing said transmitter characteristic signal into a plurality of equal frequency excursion segments based upon a preselected reference amplitude thereof, to develop measured time signals proportional to and indicative of the frequency versus time relationship of said interrogation signal over each of said discrete signals;
   f. timing means responsive to the sweep slope signal of said sweep slope means for establishing N equal time periods over the duration of a single sweep to provide comparison time signals;
   g. processor means for comparing said measured time signal for a selected one of said sampling time segments with said comparison time signal to develop an error signal proportional to and indicative of any nonlinearity in said sweep over said time segment;

wherein said error signal is applied to said accumulator/memory means for updating the respective sweep slope coefficient thereby linearizing said sweep over the correlative time segment.

2. The network of claim 1, wherein said driver means is a multiplying digital-to-analog converter.

3. The network of claim 2, wherein the output of said driver means is integrated and applied to drive a signal controlled oscillator for developing said sweep.

4. The network of claim 2, wherein said accumulator/memory is a random access memory.

5. The network of claims 1, 2, 3 or 4, wherein said discriminator means receives a generally sinusoidal transmitter characteristic signal and measures the time period $t_i$ to $t_{i+1}$ as one cycle of said characteristic signal based on said reference amplitude thereof, and said timing means includes clock means providing a timing pulse for each of said N periods $t_r$, $t_{r+1} \ldots t_{r+n}$.

6. The network of claim 5, wherein said processor means comprises means for computing said error signal in accordance with an algorithm:

$$k \cdot E = \frac{t_{i+1} - t_i}{c(t_{r+x} - t_r)} - \frac{1}{cx}$$

wherein k, c and x are constants selected to provide a fractional error signal.

7. The network of claim 6, wherein the term ($t_{r+x}-t_r$) is greater than the term ($t_{i+1}-t_i$).

8. The network of claim 6, wherein said timing means further comprises a voltage-to-frequency converter receiving said sweep slope signal for developing timing command signals for each of $N_i$ sweep segments.

9. A sweep linearization network for an FM/CW radar system wherein the transmitter sweep rate is subject to variation as a function of range, said network comprising:
   (a) a sweep slope circuit providing an adjustable sweep slope signal for controlling the sweep rate of the interrogation signal of an FM/CW radar transmitter;
   (b) a random access memory having N address locations wherein individual sweep slope coefficients are stored corresponding to individual segments of a single sweep of transmitter frequency;
   (c) a multiplying digital-to-analog converter receiving said sweep slope signal and, sequentially said sweep slope coefficients for generating a driving signal, the characteristics of which are controlled by said sweep slope signal and composite of said sweep slope coefficients;
   (d) integrator means for generating a driving ramp signal in response to said driving signal;
   (e) an oscillator having a swept FM output signal, responsive to said driving ramp signal;
   (f) sampling means monitoring said output signal for providing a transmitter characteristic signal;
   (g) mixer means receiving said transmitter characteristic signal and a delayed transmitter characteristic signal having a phase shift of 360° at a specified frequency, for developing an equal frequency excursion segmented sampling signal;
   (h) a voltage comparator for detecting the period of the individual segments of said sampling signal based upon a reference amplitude thereof to yield a measured time segment signal;
   (i) timing means for timing said individual segments and measuring the periods thereof in response to the output of said voltage comparator;
   (j) register means for storing the timed values for a selected one of said segments of the measured time signal and at least one comparison interval having a relative period of 1/N;
   (k) processor means for computing a time error signal as a ratio of the time period for said selected one of said segments of the measured time signal to said at least one comparison interval;
   (l) an add/subtract circuit receiving the sweep coefficient for a given sweep segment $N_i$ and said error signal in respect thereof, for developing a modified coefficient as an input to said digital-to-analog converter and updating that coefficient stored in said random access memory; and,
   (m) a voltage to frequency converter receiving said sweep slope signal for generating timing command pulses establishing N segments for each of said sweeps.

10. The network of claim 9, wherein said segmented sampling signal is a generally sinusoidal signal and said voltage comparator and timing means measure the periods $t_i$ of said sampling signal, where i is an integer from 1 to N; and further wherein said timing means provides timing signals $t_r$ having a period 1/N for comparison with said selected one of said segments $t_{i+1}-t_i$ in accordance with the algorithm:

$$k \cdot E = \frac{t_{i+1} - t_i}{c(t_{r+x} - t_r)} - \frac{1}{cx};$$

wherein k, c and x are constants for scaling the error signal E.

11. The network of claim 10, wherein the term ($t_{r+x}-t_r$) is greater than the term ($t_{i+1}-t_i$).

12. A method for linearizing the sweep of the interrogation signal of an FM/CW radar system, wherein the sweep rate of said interrogation signal is subject to variation as a function of range, comprising the steps of:
   (a) developing a sweep slope signal for controlling the sweep rate of the interrogation signal of an FM/CW radar;
   (b) storing in an updatable memory a plurality of N sweep slope coefficients corresponding to N discrete segments of an individual sweep of said interrogation signal;
   (c) applying said slope signal and, sequentially, said sweep slope coefficients as inputs to a driver for developing a ramp signal establishing the slope characteristics of said interrogation signal;
   (d) sampling said interrogation signal to develop a transmitter characteric signal;
   (e) discriminating said transmitter characteristic signal into a plurality of measured time periods $t_i$ for equal frequency excursions, where i is an integer from 1 to N;
   (f) generating a comparison time signal of clock pulses $t_r$ having an equitemporal period 1/N;
   (g) comparing a selected one of said measured time periods with at least one interval of said comparison time signal to develop an error signal proportional to and indicative of any slope error in said sweep; and,
   (h) applying said error signal to said memory to update the sweep slope coefficient corresponding to said selected one of said measured time periods.

13. The method of claim 12, wherein said error signal is developed in accordance with the algorithm:

$$k \cdot E = \frac{t_{i+1} - t_i}{c(t_{r+x} - t_r)} - \frac{1}{cx}$$

wherein k, c and x are constants selected to yield a fractional error signal E.

14. The method of claim 13, further comprising the step of generating timing signals having a period 1/N by applying said slope signal to a voltage-to-frequency converter, whereby said timing signals are correlated to said sweep rate.

15. The method of claims 12, 13 or 14, wherein said error signal for said selected time period is developed as a scaled error signal during a given sweep cycle and applied for correction to said sweep slope coefficient during a subsequent sweep cycle.

16. The method of claims 12, 13 or 14, wherein said error signal for said selected time period is developed as a scaled error signal over a plurality of sweep cycles and applied for correction to said sweep slope coefficient during a subsequent sweep cycle.

* * * * *